United States Patent Office 2,967,206
Patented Jan. 3, 1961

2,967,206

METHOD OF PREPARING POLYPROPYLENE WITH A SUB CHLORIDE OF ZIRCONIUM OR TITANIUM ACTIVATED BY MONO ALKYL ALUMINUM DIHALIDE

Archibald P. Stuart, Media, and Habet M. Khelghatian, Springfield, Pa., assignors to Sun Oil Company, Philadelphia, Pa., a corporation of New Jersey No Drawing. Filed Oct. 28, 1957, Ser. No. 692,554

6 Claims. (Cl. 260—683.15)

This invention relates to a process for the preparation of relatively low molecular weight normally liquid polymers of propylene. More particularly, it relates to the preparation of low molecular weight polymers of propylene suitable for use as lubricating oils, or for lubricating oil additives.

Heretofore relatively high molecular weight solid polymers of propylene have been prepared by contacting propylene with a dispersion of a catalyst such as a titanium or zirconium halide in the presence of an organometallic activator such as triethyl aluminum, in an inert, liquid reaction medium. Generally such processes produce polymers of propylene having molecular weights of above about 25,000 and usually within the range of from about 50,000 to 500,000. The polymer thus obtained is solid at ordinary temperatures, having melting points generally in the range of 150° C. to 175° C. A major proportion of such polymers is crystalline, i.e., exhibits a crystalline structure by X-ray analysis. The crystalline polymer is relatively insoluble in the normal hydrocarbon solvents, except at high temperatures. Such solid, predominantly crystalline polymers have been prepared by contacting propylene with titanium tetrachloride and triethyl aluminum. It has been found that if the trichloride of titanium is used instead of the tetrachloride, a larger proportion of the polymer formed is crystalline. Similarly, the substitution of diethyl aluminum chloride for triethyl aluminum, or of the sesquihalide (an equimolar mixture of diethyl aluminum chloride and monoethylaluminum dichloride) results in the production of predominantly crystalline solid polymers, having molecular weights usually above 25,000.

It has now been found that if a subchloride of titanium or zirconium is used as a catalyst and is activated by a monoalkyl aluminum dichloride, no solid polymer is formed, but only relatively low molecular weight liquid polypropylene, which has utility as a lubricating oil additive.

It is therefore an object of this invention to provide a process for the preparation of relatively low molecular weight normally liquid polypropylenes. It is another object to provide a process for the preparation of such low molecular weight polypropylenes which are useful in lubricating oils.

The catalysts which may be used for this process are the subchlorides of titanium and zirconium, i.e., a chloride wherein the metal is in a valence state other than its highest valence state. For example, titanium trichloride and zirconium trichloride and the corresponding dichlorides give good results. The activator used is a monoalkyl dichloride of aluminum wherein the alkyl group has from one to four carbon atoms. For example, satisfactory activators include monomethyl aluminum dichloride, monoethyl aluminum dichloride, monopropyl aluminum dichloride, and mono-isobutyl aluminum dichloride. Generally a mole ratio of activator to metal halide of 0.1:1 to 12:1 is used. Temperatures from 0° C. to 170° C. are suitable. Atmospheric pressure can be used, although elevated pressures are preferred in that the polymerization reaction proceeds at a faster rate at such elevated pressures, say up to about 10,000 p.s.i.g. (pounds per square inch gauge).

The polymerization reaction preferably is carried out in an enclosed reactor fitted with a stirrer to agitate the reaction medium so that the catalyst particles remain in dispersion therein. The reactor must be free of oxygen and water, since these materials will deactivate the catalyst, and the reaction is carried out under substantially anhydrous and oxygen free conditions. An inert, liquid hydrocarbon, such as, for example, n-heptane, isooctane, or mixtures of various saturated hydrocarbons, is normally used for the reaction medium. Preferably the catalyst and the activator are independently added to the reaction medium, and gaseous propylene introduced into the mixture while maintaining constant agitation. As an alternative, however, propylene may be dissolved in the reaction medium, under pressure, and the catalyst and activator added, either separately or together, usually dispersed in an additional portion of the reaction medium. The catalyst used is in the form of finely divided solid particles, which are preferably maintained in a dispersion in the reaction medium by constant stirring during the polymerization reaction, since polymerization is thereby made to proceed more rapidly. During the polymerization reaction, which begins as soon as the propylene is contacted by the catalyst and activator, additional propylene is added to maintain the desired pressure in the reactor. The addition of propylene is continued until polymerization has proceeded to the extent desired, or until the reactor is filled. The catalyst may then be deactivated by adding water or alcohol and the polypropylene separated by any convenient means, such as, for example, by distillation. The catalyst may, however, be separated without first deactivating in which case the catalyst can then be reused. The polymer obtained is comparatively low molecular weight liquid polypropylene, usually within the range of about 200 to 5,000 molecular weight. No solid polypropylene is formed. The product may be fractionated by distillation to obtain the desired product. Polymer in the upper portion of this range is useful as a viscosity increasing additive for lubricating oils, and to raise the viscosity index of such oils. The polymer in the lower portion of this range may be used as a lubricant, or as a pour point depressant for lubricating oils.

The following examples describe the process of this invention and compare it with similar processes which produce solid polypropylene. In the examples, "parts" refers to parts by weight.

*Example 1*

Under a nitrogen atmosphere, 1400 parts of a reaction medium consisting of a mixture of saturated hydrocarbons, mostly octanes, were introduced into a reactor containing a stirrer. To this was added a solution of 1.093 parts of monoethyl aluminum dichloride in 450 parts of the same saturated hydrocarbon reaction medium. The mixture was heated to 71° C., and at this temperature 943 parts of propylene were introduced into the reaction medium. The stirrer was then started, and 2.19 parts of titanium trichloride particles dispersed in 280 parts of the reaction medium was added. Polymerization began immediately, as evidenced by a drop in the pressure in the reactor. Additional propylene was added to maintain the pressure at about 258 p.s.i.g. After 2.17 hours, 107 parts of propylene had been added. Methanol was added to stop the reaction, and the unreacted propylene was vented. The deactivated catalyst was separated, and the reaction medium evaporated, leaving 154 parts of liquid polypropylene having an average molecular weight of 290.

*Example 2*

The process of Example 1 was repeated, except that triethyl aluminum was used instead of monoethyl aluminum dichloride. In this instance 1.32 parts of titanium trichloride and 5.75 parts of triethyl aluminum were used. A total of 1270 parts of propylene were introduced into the reactor, and the reaction was carried out at approximately the same temperature and pressure as described in Example 1. After 6 hours, polymerization virtually ceased, due to the coating of the catalyst particles by polymer. This reaction resulted in the formation of 705 parts of solid polypropylene which were found to be about 71% crystalline polypropylene, having a molecular weight of about 245,000.

*Example 3*

The process as described in Example 1 was repeated, using 2.77 parts of titanium trichloride and 2.46 parts of diethyl aluminum monochloride in the reaction medium. These were contacted with 1300 parts of propylene. This process resulted in the formation of 180 parts of solid polypropylene of which 92% was crystalline, having a molecular weight of 347,000.

Similarly, catalysts such as titanium tetrachloride, zirconium tetrachloride, titanium tribromide, vanadium trichloride, and tungsten hexachloride, when activated by materials such as triethyl aluminum, tridecyl aluminum, didodecyl aluminum chloride, and diisobutyl aluminum chloride, yield only solid polymers of propylene. However, titanium dichloride, and the zirconium subchlorides, when activated by monoalkyldichlorides of aluminum, cause the polymerization of propylene to low molecular weight normally liquid polymers.

The invention claimed is:

1. A process for preparing normally liquid polymers of propylene which comprises contacting propylene, under polymerizing conditions, with a catalyst consisting of a subchloride of a metal selected from the group consisting of titanium and zirconium in combination with an activator therefor, which is a monoalkyl aluminum dichloride, wherein the alkyl group has from 1 to 4 carbon atoms.

2. A process as defined by claim 1 wherein the subchloride selected is titanium trichloride.

3. A process as defined by claim 1 wherein the activator is monoethyl aluminum dichloride.

4. A process for preparing low molecular weight normally liquid polymers of propylene which comprises contacting propylene at a temperature between 0° C. and 170° C., and a pressure between atmospheric and 10,000 p.s.i.g., with a catalyst consisting of a subchloride of a metal selected from the group consisting of titanium and zirconium in combination with an activator therefor, which is a monoalkyl aluminum dichloride, wherein the alkyl group has from 1 to 4 carbon atoms, and recovering said normally liquid polymers.

5. A process for preparing low molecular weight normally liquid polymers of propylene which comprises contacting propylene, under polymerizing conditions, with a catalyst consisting of titanium trichloride and monoethyl aluminum dichloride.

6. A process for preparing low molecular weight normally liquid polymers of propylene which comprises contacting propylene at a temperature of from 0° C. to 170° C., and a pressure of from atmospheric to 10,000 p.s.i.g. with a catalyst consisting of particles of titanium trichloride dispersed in a liquid reaction medium, and monoethyl aluminum dichloride, whereby liquid polymers having a molecular weight of from about 200 to about 5,000 are formed, and separating said liquid polymers from said reaction medium.

References Cited in the file of this patent

UNITED STATES PATENTS

| | | |
|---|---|---|
| 2,827,447 | Nowlin et al. | Mar. 18, 1958 |
| 2,846,427 | Findlay | Aug. 5, 1958 |

FOREIGN PATENTS

| | | |
|---|---|---|
| 534,792 | Belgium | Jan. 31, 1955 |
| 538,782 | Belgium | Dec. 6, 1955 |
| 526,101 | Italy | May 14, 1955 |

Notice of Adverse Decision in Interference

In Interference No. 91,914 involving Patent No. 2,967,206, A. P. Stuart and H. M. Khelghatian, Method of preparing polypropylene with a sub chloride of zirconium or titanium activated by mono alkyl aluminum dihalide, final judgment adverse to the patentees was rendered May 27, 1964, as to claims 1, 2, 3, 4, 5 and 6.

[*Official Gazette August 25, 1964.*]